Oct. 19, 1971  F. L. FORD  3,613,314
ROLLAWAY FENCE GATE
Filed Oct. 17, 1969  3 Sheets-Sheet 1
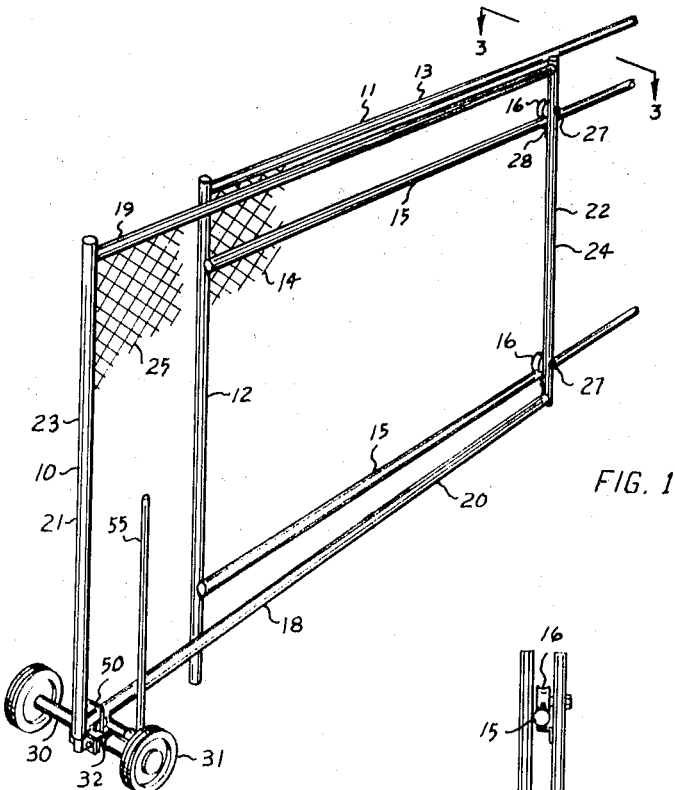
FIG. 1
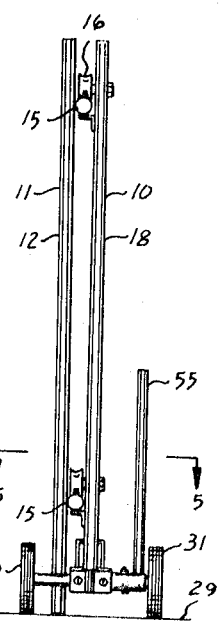
FIG. 2
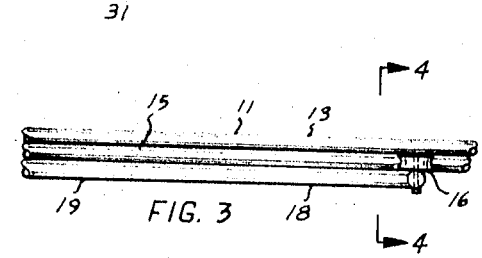
FIG. 5
FIG. 3
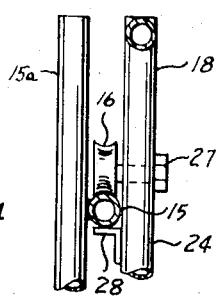
FIG. 4
INVENTOR.
FRANCIS L. FORD
BY Roger L. Martin

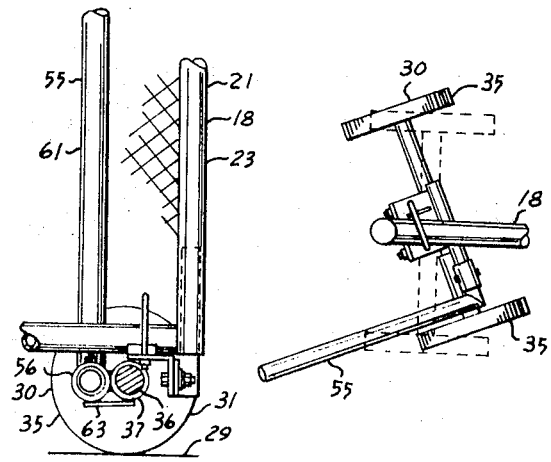
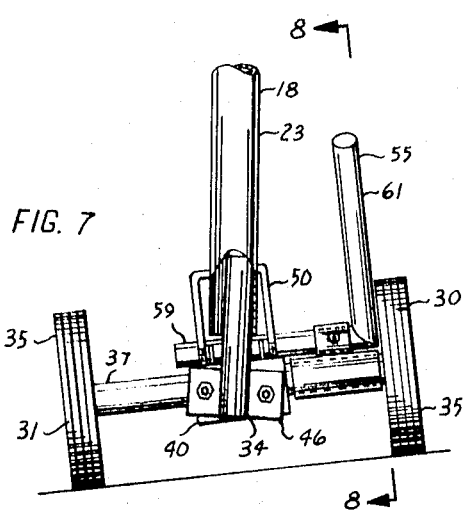
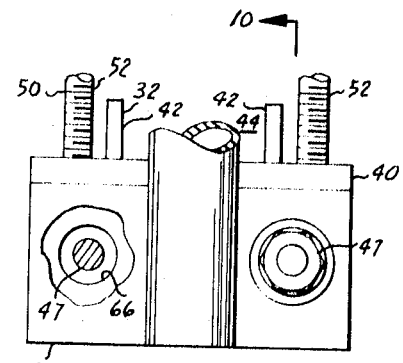
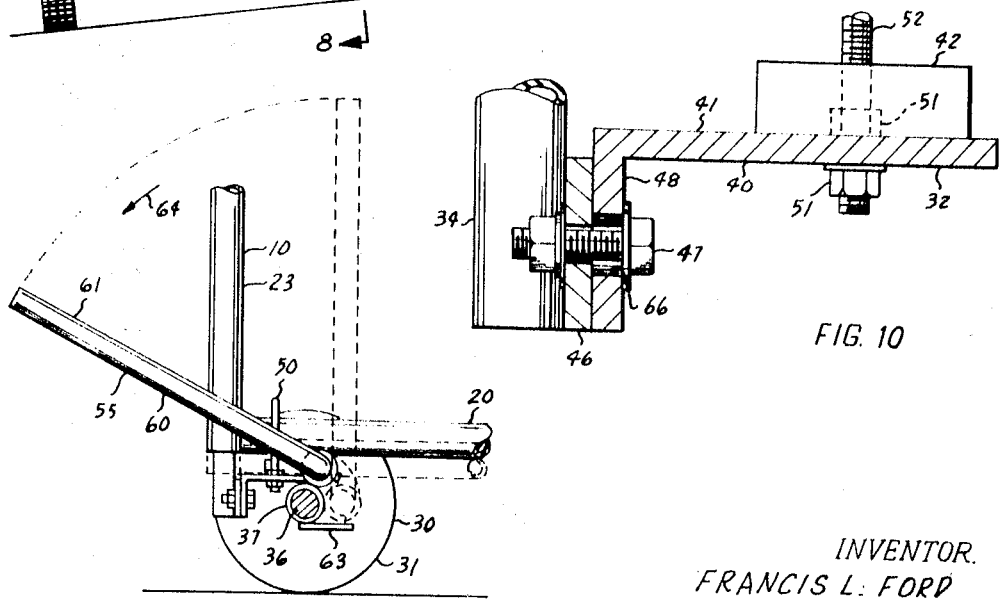

United States Patent Office 3,613,314
Patented Oct. 19, 1971

3,613,314
ROLLAWAY FENCE GATE
Francis L. Ford, 1110 Raymond Ave.,
Fort Pierce, Fla. 33450
Filed Oct. 17, 1969, Ser. No. 867,163
Int. Cl. E05d 13/02
U.S. Cl. 49—425
5 Claims

ABSTRACT OF THE DISCLOSURE

In a rollaway fence gate, one end of the gate frame is supported by guide rail traversable wheels while the other end is supported on a pivotally movable support assembly that includes a ground contacting wheel assembly which has a pair of spaced wheels. The bottom rail of the gate frame rests on a seat component of the support assembly and is straddled by a pair of members that serve as stops which prevent pivotal movement of the support assembly when the rail is seated. The pivot is carried by the support assembly and permits relative axially movement of the frame and support assembly, and a lever mounted on the wheel assembly is manipulatable to move the frame relative to the support assembly so as to disengage the stops and permit pivotal movement of the wheel assembly. The mounting for the pivot is adjustable to permit adaptation of the wheels to the ground contour.

---

This invention relates to a rollaway fence gate and more particularly to a rollaway fence gate that is supported at one end through a ground contacting wheel assembly.

Rollaway fence gates are known in the art and, in lieu of hinging the gate to a gate post, the gate is supported in a manner such that the gate is opened and closed by movements in the general plane of the fence structure itself. This type of arrangement is provided in some cases to conserve space in the fenced area which would normally fall within the reach of the gate if it were hinged for swinging movement from a fence post. In other cases, a rollaway fence gate is provided because the weight of the gate for the fence opening is too great to permit use of conventional means for hinging the gate to a gate post.

The conventional rollaway gate is usually supported at one end by rail following wheels that are adapted to traverse, during opening and closure of the gate, elongated rails which are suitably mounted on the adjacent fence structure. The other end of the gate on the other hand, is supported through a ground contacting wheel assembly that normally includes a pair of spaced wheels which are rotatable about a common axis that is transverse to the normal path of movement for the fence gate and fixed in relation to the gate frame. This arrangement creates certain problems in that not infrequently when one is pulling the gate to its closed position, the gate traverses a path which is out of alignment with the general plane of the fence structure. This is sometimes caused by lack of attention on the part of the gate operator and at other times to a slope or inclined ground contour in the area of the fence opening. As a result, the need arises at the closed position to lift the gate in order to reorient it and place it in its proper closure forming position whereas if the wheel assembly was pivotally mounted to the gate frame in a suitable manner, this lifting of the gate would be unnecessary and the gate operator could simply reorient the gate by drawing it into its proper position on the pivotally mounted wheel assembly.

A general object of the invention is to provide improvements in rollaway fence gate structure.

Another object of the invention is to provide a gate structure of the rollaway type which can be adjusted in location by the gate operator without the need for lifting the gate and by simply causing the supporting wheel structure to pivot relative to the gate frame as the gate is being pulled.

Yet another object of the invention is to provide a wheeled pivotal supporting arrangement for one end of a rollaway fence gate and which permits the wheel assembly to be adjusted to conform to the ground contour in the area of usage of the gate.

Yet another object of the invention is to provide a rollaway fence gate with a wheel support which is normally held in a position to accommodate movement of the gate in the plane of the fence but which can be released to permit pivotal movement of the wheel assembly relative to the gate frame by the simple manipulation of a lever by the gate operator to enable adjustments in the direction of movement of the gate by the gate operator.

Another object of the invention is to provide a wheeled support for rollaway gates and which is equipped with a lever that is manipulatable to permit pivotal movement of the support and relocatable in the assembly so that the lever can be selectively located at either side of the fence gate in its final assembly.

In accord with the invention, the rollaway fence gate is provided with a wheeled support assembly at one end of the gate frame and the support assembly is so mounted as to be capable of pivotal movement relative to the gate frame about a generally vertical axis. In accord with one aspect of the invention, the wheeled support assembly is equipped with a seat on which the bottom rail member of the gate frame rests and which is provided with spaced components that straddle the bottom rail member to serve as stops that inhibit pivotal movement of the support assembly about the pivot axis when the bottom rail member is thus at rest on the seat. Yet another aspect of the invention has to do with the provision of a lever mechanism which is carried by the support assembly and which is capable of being manipulated to raise the gate frame relative to the support assembly so that the bottom rail becomes disengaged from the stops and releases the support assembly for pivotal movement about the vertical axis.

Yet another aspect of the invention has to do with the provision of a mount for the lever mechanism and which enables the lever to be relocated on the wheel assembly so that the lever can be located at the enclosed side of the fenced area during the assembly of the gate. Still another feature has to do with the provision of a pivot which is adjustably mounted on the wheeled support assembly and which basically enables the wheeled assembly to be adjusted by tilting to conform with the ground contour at the gate area. Other features will be apparent from the following detailed disclosure.

The novel features which are believed to be characteristic of this invention are set forth with particularity in the appended claims. The invention, itself, however, both as to its organization and method of operation, together with further objects and advantages thereof, may best be understood by reference to the following description taken in connection with the accompanying drawings, in which:

FIG. 1 is a perspective view of a rollaway fence gate embodying the principles of the invention as seen in conjunction with an adjacent section of the fence, certain parts being broken away and others removed;

FIG. 2 is an end elevational view along the lines 2—2 of FIG. 1 with certain parts removed and others broken away;

FIG. 3 is a top plan view of a fragment of the structure shown in FIG. 1 as seen along the lines 3—3 therein, with certain parts being broken away and others removed;

FIG. 4 is an elevational section of a fragment along the lines 4—4 of FIG. 3 with certain parts being removed;

FIG. 5 is a horizontal sectional view along the lines 5—5 of FIG. 2;

FIG. 6 is a vertical section along the lines 6—6 of FIG. 5, with certain parts removed and others broken away;

FIG. 7 is an end elevational view of a fragment of the fence gate with parts broken away and shows the support assembly in an adjusted position at which the wheel assembly is adapted and arranged to conform to an inclined ground contour in the gate area;

FIG. 8 is a sectional view along the lines 8—8 of FIG. 7;

FIG. 9 is an elevational view of a fragment of the support assembly with certain parts removed and/or broken away to illustrate the means for adjustably connecting the pivot member to the support assembly;

FIG. 10 is a vertical section view along the lines 10—10 of FIG. 9;

FIG. 11 is a horizontal sectional view through a fragment of the fence gate and illustrates the pivotal movement of the support assembly.

Figure 12:
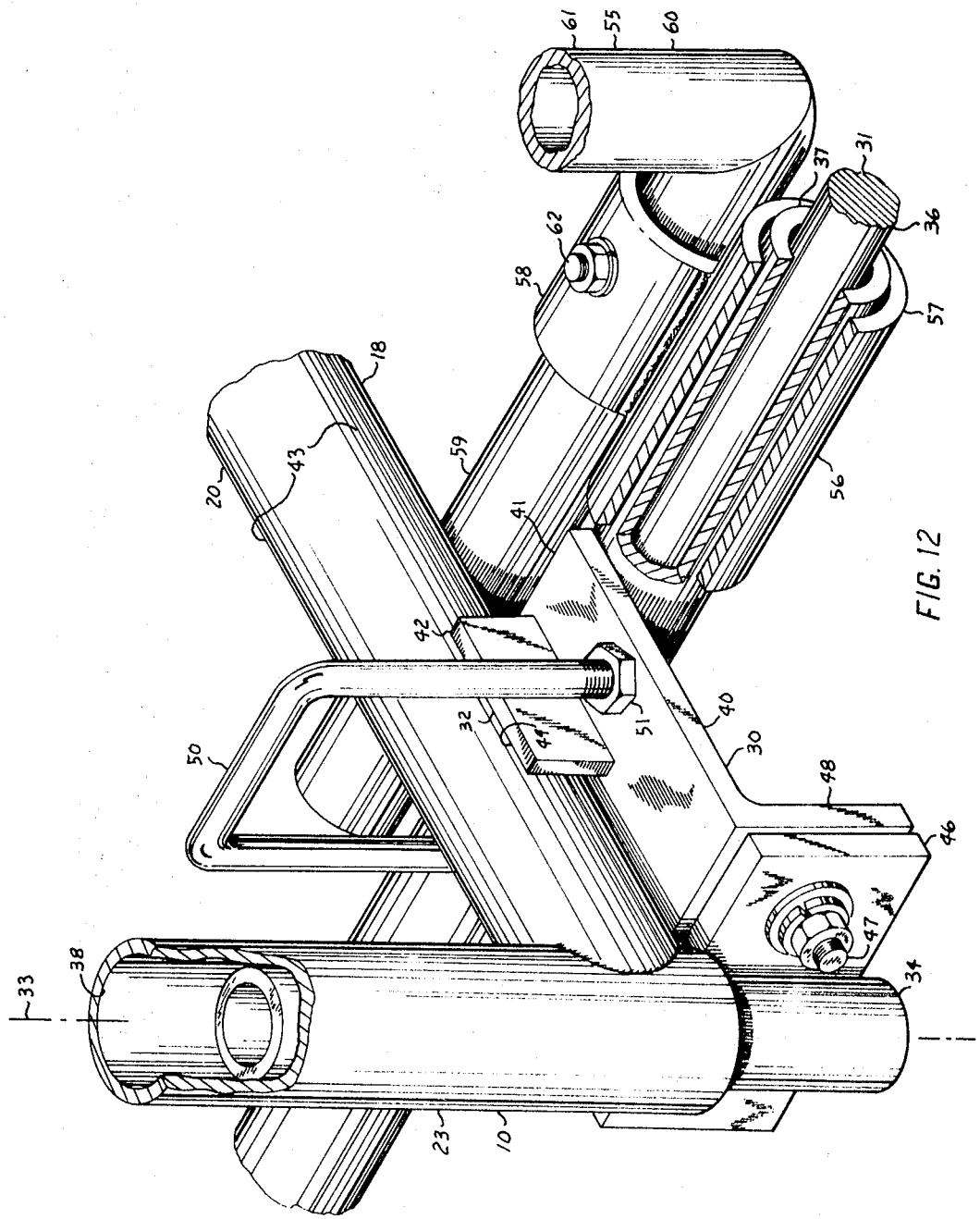
FIG. 12 is a generally isometric view of certain parts of the wheeled support assembly and adjacent gate frame structure with certain parts broken away and others removed.

Reference is now made to the drawings and where a rollaway fence gate embodying the principles of the invention is designated at 10. The gate 10 is shown in FIG. 1 in conjunction with a fence section 11 that includes a gate post 12, and a horizontal top rail 13 that supports a wire mesh 14 at the outside of the enclosed area. The section 11 has a pair of vertically spaced horizontally extending guide rails 15 which are fixed at their opposite ends to the gate post 12 and another post 15a adjacent thereto in the fence section. These rails 15 are located at the enclosed area side of the fence and serve as track forming guide rails for a pair of gate frame support wheels 16 that are located at one end of the gate 10.

The frame 18 of the gate 10 is generally rectangular in configuration in the illustrated embodiment and includes top and bottom horizontally extending rail members, 19 and 20. Members, 19 and 20, are interconnected at the opposite ends, 21 and 22, of the frame by upright structural end members, 23 and 24, to provide a rigid frame structure on which a wire mesh section 25 is secured to provide a suitable gate barrier.

At the rail end 22 of the frame 18, the rail traversable wheels 16 are mounted for rotation about the axes of appropriate shaft members 27 that are spaced apart and fixed to end member 24 of the frame. The wheels 16 are appropriately grooved, as seen in FIG. 4, and end member 24 carries a pair of angle elements 28 that are welded to the frame 18 immediately below the guide rails 15 to prevent the wheels 16 from being dislodged from their respective guide rails 15. Each angle 28, as seen in FIG. 4, has a leg that projects beneath the adjacent guide rail 15. This leg is contiguous to the rail and encounters the rail upon upward movement of the frame end 22 so that the angles accordingly serve to keep the guidable wheels 16 on the track forming rails 15.

The rail end 22 of the frame is, of course, supported above the ground 29 by means of the support wheels 16. The latch end 21 of the frame, on the other hand, is supported by a wheeled support assembly 30 that includes a ground contacting wheel assembly 31. Assembly 31, together with the other components of assembly 30, is connected to the frame for relative pivotal movement about a generally vertical axis 33.

The support assembly 30 includes a component 32 which is fixed to the wheel assembly 31 intermediate the wheels 35 thereof and provides a seat, in the normal arrangement of the gate components, for the bottom rail 20 of the frame 18, as is best seen in FIG. 12. The structural members of the frame 18 are hollow tubular members which are welded together in the frame structure and the support assembly 30 carries a short upright extending and pivot forming tubular length 34 which is received in the hollow 38 at the lower end of the latch end frame member 23 in the assembled gate. This pivot forming length 34 as thus engaged with the frame end member 23 establishes the axis 33 for pivotal movement of the support assembly 30 with respect to the frame 18.

The wheel assembly 31 includes a pair of spaced ground contact wheels 35 that are mounted for rotation at the opposite ends of an axle 36 which provides a common axis for their rotation and which is housed in a coaxially arranged tubular housing 37 that spans the space between the wheels 35 in the assembly 31. The wheels 35 can be removed from the axle 36 of the assembly 31 to facilitate removal from the assembly 31 of certain components of a lever mechanism to be described subsequently.

The seat component 32 of the support assembly 30 includes an L-shaped bracket 40 which has a leg 41 that is welded to the axle housing 37 at an intermediate location in the space between the wheels 35 of the assembly 31. The bottom rail 20 normally rest on leg 41 in the assembled gate and the leg 41 has a pair of spaced rectangular elements 42. These elements 42 are welded upright on the leg 41, at opposite sides 43 of rail 20, and basically serve as stops that inhibit pivotal movement of the assembly 30 with respect to frame 18 by engagement with the opposite sides 43 of the rail 20 in the space 44 therebetween. This arrangement provides a seat component in the assembly 30 which straddles the rail 20 at a point that is offset from the pivot axis 33 and thereby prevents pivotal movement of the assembly 30 unless the frame 18 is raised with respect to the support assembly 30 to a position at which the rail is disengaged from the side elements 42 of the seat 32.

The pivot forming element or length 34 is welded to a small plate 46 that is bolted by bolt-type fasteners 47 to the other leg 48 of the L-shaped bracket 40, as seen in FIGS. 9, 10 and 12. The length 34 is adapted for loose reception in the hollow 38 of end member 23 so that the pivot forming length 34 and member 23 are relatively axially movable in the assembled gate. This arrangement permits the frame 18 to be lifted or raised to unseat the rail member 20 and thereby permit pivotal movement of the support assembly 30 with respect to the frame 18.

Leg 41 carries a U-bolt 50 which is securely fastened to the leg 41 by means of nuts 51. The bolt 50 straddles the bottom rail 20 in the assembled gate and is so arranged as to limit upward movement of the frame with respect to the support assembly 30. The arrangement here is such that the bolt permits the frame to be raised relative to the support assembly 30 to a point at which the rail 20 is disengaged from the stop elements 42 of the seat but nevertheless limits movement that would cause the pivot forming length 34 to become disengaged from the end members 23 of the frame 18. The opposite legs 52 of the bolt 50 also serves as stop elements that limit pivotal movement of the assembly 30 with respect to the frame 18 through engagement with the sides 43 of the bottom rail 20 as indicated in FIG. 1.

The frame 18 is raised with respect to a wheeled support assembly 30 by the manipulation of a lever mechanism 55 that is mounted for pivotal movement on the axle housings 37 of assembly 31. The mount 56 of the mechanism includes a sleeve 57 that is coaxially arranged on the axle housing 37 between the seat component 32 and the inside wheel of the gate assembly 10. A second sleeve component 58 of mount 56 is welded to sleeve 57, as seen in FIG. 12 and this sleeve 58 is adapted to receive one leg 59 of an elongated L-shaped tubular member 60 that provides a handle 61 for the manipulation of the mechanism 55. The tubular member 60 is fastened to the sleeve component 58 of mount 56 by a bolt-type fastener 62 which extends through aligned holes, not shown, in the wall of the sleeve 58 and also through aligned holes (not shown) in the leg component 59 of tube 60. As mounted on the axle housing, the leg of lever 55 extends beneath the bottom rail 20 of frame 18 and normally rests when the mechanism 55 is not in use on a small plate 63 that is welded to the bottom of the axle housing 37 to support the lever against clockwise rotation, as the mechanism is viewed in FIG. 8.

To raise the frame 18, the handle 61 is pulled by the gate operator in the direction of arrow 64, as seen in FIG. 8. This causes the leg 59 underlying the rail 20 to pivot with the mount 56 about the axis of the axle and its housing 37 and thereby, through contact with the bottom of the rail 20, to lift or raise the rail 20 above the seat and to a point at which the rail 20 is disengaged from the side elements 42 so that the assembly 30 can then be pivotally moved about the axis 33 of the pivot within the limits provided by the legs 52 of bolt 50.

The components of the lever mechanism 55 are so constructed as to enable the mechanism to be mounted on the axle housing 37 at either side of the bracket 40 so that one can select the side of the gate at which the handle is located. Thus, by removing the wheels 35 of assembly 31, the mount 56 and member 60 can be removed from the axle housing 37, disassembled, and then remounted on the axle housing 37 at the other side of the bracket 40 so that the lever leg 59 extends beneath the frame 18.

As seen in FIGS. 9 and 10, the bolt-type fasteners 47 that connect the plate 46 to the leg 48 of bracket 40 are somewhat larger than the diameters of the fasteners 47. This arrangement permits the wheel assembly 31 to be adjusted to an angle with respect to the generally vertical pivot axis therefor, so as to conform to an inclined ground contour in the fence opening area such as shown in FIG. 7.

From the foregoing description it is evident that the bottom rail 20 is normally engaged between the stop element 42 of the support assembly 30 in the assembled gate. Under such circumstances, the wheel assembly is incapable of pivoting relative to the frame and the gate operator can move the gate between its closed and opened positions. When the need arises to adjust the location of the latch end of the gate, all the operator has to do is pull on the handle 61 so as to elevate the rail 20 above the components and then pull the latch end 23 in the direction of needed adjustment while holding the handle down to permit the wheel assembly to pivot relative to the frame to accommodate the direction of imparted pull.

While only a certain preferred embodiment of this invention has been shown and described by way of illustration, many modifications will occur to those skilled in the art and it is, therefore, desired that it be understood that it is intended herein to cover all such modifications as fall within the true spirit and scope of this invention.

What is claimed as new and what it is desired to secure by Letters Patent of the United States is:

1. A rollaway fence gate comprising a rigid frame having a horizontal bottom rail and hollow upright opposite end members, frame supporting guidable means mounted on one of said end members, a wheeled frame support assembly, and pivot means mounted on the assembly and engaging the other of said end members in the hollow thereof to establish a generally vertical pivot axis for pivotal movement of the assembly with respect to the frame; said support assembly including a wheel assembly comprising an axle, a pair of spaced wheels removably mounted for rotation on and about the axis of the axle, and an axle housing spanning the space between said wheels; said support assembly including a seat for said bottom rail which is fixed to the housing intermediate said spaced wheels and which has spaced side means offset from said pivot means and inhibiting pivotal movement of the wheel assembly with respect to the frame by engagement with the bottom rail therebetween; said gate further comprising a lever mechanism mounted for pivotal movement on the wheel assembly and manipulatable to raise said bottom rail from said seat and thereby to disengage the bottom rail from the pivotal movement inhibiting side means of said seat; said lever mechanism including a mount having a first sleeve coaxially arranged on the housing between said seat and one of said spaced wheels, and a second sleeve fixed to said first sleeve, and further including elongated handle forming means having a leg secured to and extending through said second sleeve and being arranged to underlie said bottom rail.

2. A rollaway fence gate comprising a rigid frame having opposite ends, guidable means supporting the frame at one of said ends, a ground contacting wheeled support assembly supporting the frame at the other of said ends, means establishing a generally vertical pivot axis for pivotal movement of the assembly with respect to the frame, disengageable means engaged to inhibit pivotal movement of the assembly with respect to the frame, and lever means manipulatable to disengage said disengageable means and thereby permit such pivotal movement.

3. A rollaway fence gate comprising a rigid frame having opposite ends, guidable means supporting the frame at one of said ends, a ground contacting wheeled support assembly supporting the frame at the other of said ends, and means establishing a generally vertical pivot axis for pivotal movement of the assembly with respect to the frame; said wheeled assembly including spaced ground contacting wheels that are rotatable about a common axis, and said pivot axis establishing means being carried by said adjustably mounted on said assembly.

4. A rollaway fence gate comprising a rigid frame having opposite ends, rail traversable means supporting the frame at one of said ends, a support assembly supporting the frame at the other of said ends and having a pair of ground contacting wheels that are spaced apart and rotatable about a common axis, and frame engaging pivot means carried by the assembly and establishing a generally vertical pivot axis for pivotal movement of the assembly with respect to the frame; said frame having a bottom rail, said assembly having a seat forming component for the rail that includes spaced side means inhibiting pivotal movement of the assembly with respect to the frame by engagement with the bottom rail therebetween, said frame being generally axially movable with respect to the pivot means, and said fence gate further comprising lever means mounted on the assembly and manipulatable to raise the bottom rail from the seat and thereby to disengage the bottom rail from the pivotal movement inhibiting side means of said seat forming component.

5. A rollaway fence gate comprising a rigid frame having opposite ends, rail traversable means supporting the frame at one of said ends, a support assembly supporting the frame at the other of said ends and having a pair of ground contacting wheels that are spaced apart and rotatable about a common axis, and frame engaging pivot means carried by the assembly and establishing a generally vertical pivot axis for pivotal movement of the assembly with respect to the frame, said pivot means being adjustably mounted on said assembly.

References Cited

UNITED STATES PATENTS

| | | | |
|---|---|---|---|
| 92,805 | 7/1869 | Ellison | 49—427 X |
| 3,257,756 | 6/1966 | Mealer | 49—358 X |

J. KARL BELL, Primary Examiner

U.S. Cl. X.R.

16—861, 104